United States Patent
Silvis et al.

(10) Patent No.: US 7,665,296 B2
(45) Date of Patent: Feb. 23, 2010

(54) METHOD AND APPARATUS FOR USING DUAL PARALLEL NOX TRAPS FOR DIESEL EMISSIONS REDUCTION

(75) Inventors: Thomas W. Silvis, Flushing, MI (US); Joseph V. Bonadies, Clarkston, MI (US)

(73) Assignee: Delphi Technologies, Inc., Troy, MI (US)

( * ) Notice: Subject to any disclaimer, the term of this patent is extended or adjusted under 35 U.S.C. 154(b) by 361 days.

(21) Appl. No.: 11/650,142

(22) Filed: Jan. 5, 2007

(65) Prior Publication Data

US 2008/0163607 A1   Jul. 10, 2008

(51) Int. Cl.
*F01N 3/00* (2006.01)
(52) U.S. Cl. .............. 60/286; 60/274; 60/287; 60/292; 60/295; 60/324; 48/197 R
(58) Field of Classification Search .......... 60/274, 60/286, 287, 292, 295, 297, 301, 303, 32, 60/324, 288; 48/197 R
See application file for complete search history.

(56) References Cited

U.S. PATENT DOCUMENTS

| | | | |
|---|---|---|---|
| 6,105,365 A * | 8/2000 | Deeba et al. | 60/274 |
| 6,820,414 B2 * | 11/2004 | Stroia et al. | 60/286 |
| 6,959,542 B2 * | 11/2005 | Taylor et al. | 60/295 |
| 7,377,101 B2 * | 5/2008 | Mital et al. | 60/275 |
| 2006/0213187 A1 * | 9/2006 | Kupe et al. | 60/286 |

* cited by examiner

*Primary Examiner*—Binh Q Tran
(74) *Attorney, Agent, or Firm*—Thomas N. Twomey

(57) ABSTRACT

A dual NOx trap system for reducing NOx emissions from an internal combustion engine. The system is plumbed and controlled such that the NOx adsorption time of a trap is decoupled from the NOx regeneration time. A trap is taken out of service for regeneration only for the minimum required regeneration time and then is placed back into service. Because regeneration times are short relative to adsorption times, during most of the working life of the assembly both of the traps are in service in NOx-trapping mode. Thus, higher NOx-trapping efficiencies are provided over most of the working life of the system because each unit volume of catalyst is in service for more than 50% of the time, permitting a smaller volume of catalyst for each trap than in a prior art system. Further, shorter off-line regeneration times result in reduced cooling of the traps during regeneration.

13 Claims, 5 Drawing Sheets

METHOD AND APPARATUS FOR USING DUAL PARALLEL NOX TRAPS FOR DIESEL EMISSIONS REDUCTION

TECHNICAL FIELD

The present invention relates to means for reducing polluting emissions from internal combustion engines; more particularly, to methods and apparatus for reducing engine emissions of nitrogen oxides (NOx); and most particularly, to method and apparatus for efficiently using dual parallel NOx traps in an engine exhaust system.

BACKGROUND OF THE INVENTION

Internal combustion engines, and diesel engines in particular, are known to emit oxides of nitrogen under various operating conditions, which NOx may be hazardous to health. Emission limits promulgated by the US Federal government are stringent and are projected to become even more so. Accordingly, it is of great interest to engine and vehicle manufacturers to develop methods and apparatus for continuous removal of NOx from the exhaust streams of engines.

Efficient NOx traps are known in the prior art. Such traps are catalytic in nature and act to adsorb NOx from an exhaust stream passing over the catalytic surface. Periodically, however, the catalyst must be regenerated by exposure to a reductant, for example, diesel fuel or reformate. Thus, for continuous operation, it is known to provide first and second NOx traps arranged in parallel for alternative operation by a four-port diverter valve. While the first trap is being regenerated, the second trap is in service; when the second trap needs regeneration, the first trap is switched into service and the second into regeneration. Following regeneration, a typical prior art NOx trap has an effective adsorption lifetime of between about 25 seconds and 120 seconds. Regeneration requires typically about 5 seconds.

An expensive drawback of a prior art dual trap system is that each trap must be capable of treating the entire emission load by itself, and thus twice the required catalyst volume is needed to maintain targeted emission levels continuously. Further, each trap must occupy the minimum space required for treating the entire emission load.

A further disadvantage of a prior art dual trap system is that during regeneration a trap undergoes significant cooling and thus has lowered adsorption effectiveness for some period of time when coming up to operating temperature when placed back into service.

What is needed in the art is a means for reducing the overall size and cost of a continuously-operable NOx trap assembly.

What is further needed in the art is a means for minimizing the cooling which a trap undergoes while out of service for regeneration.

It is a principal object of the present invention to reduce the size and cost of a continuously-operable NOx trap assembly.

It is a further object of the present invention return a trap to service after minimal temperature loss.

SUMMARY OF THE INVENTION

Briefly described, a dual NOx trap system in accordance with the invention is plumbed and controlled such that the NOx adsorption time of a trap is decoupled from the NOx regeneration time. The two traps are simultaneously operable in parallel flow. A trap is taken out of service for regeneration only for the minimum required regeneration time and then is placed back into service. Because regeneration times are short relative to adsorption times, during most of the working life of the system both of the traps are in service in NOx-trapping mode. Thus, higher NOx-trapping efficiencies are provided over most of the working life of the assembly because each unit volume of catalyst is in service much more than 50% of the time, unlike in the prior art, permitting a smaller volume of catalyst for each trap. Further, shorter off-line regeneration times result in less cooling of the traps during regeneration.

BRIEF DESCRIPTION OF THE DRAWINGS

The present invention will now be described, by way of example, with reference to the accompanying drawings, in which.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
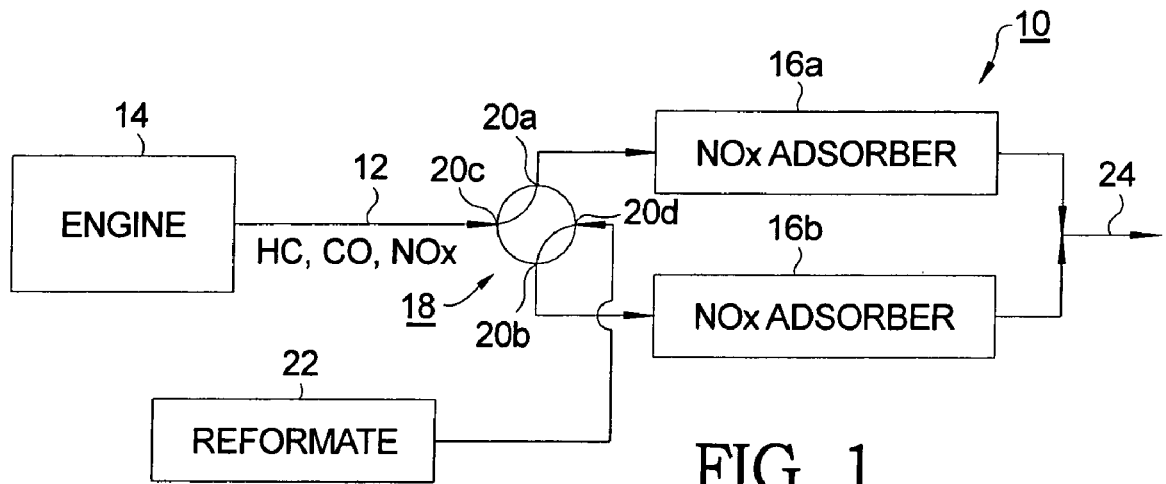
FIG. 1 is a schematic diagram of a prior art dual NOx trap system.

Referring to FIG. 1, a prior art dual trap emissions adsorber system 10 for controlling exhaust emissions 12 from an internal combustion engine 14 comprises a first catalytic NOx trap 16a and a second catalytic NOx trap 16b supplied with exhaust emissions 12 via a four-port valve 18. Traps 16a, 16b are connected to first and second opposite ports 20a, 20b of valve 18, respectively, and engine 14 and reductant 22 are connected to third and fourth opposite ports 20c, 20d, respectively. As shown in FIG. 1, valve 18 is positioned to deliver emissions through first trap 16a for storage of NOx to yield a cleaned exhaust 24, and reductant 22 through second trap 16b simultaneously for regeneration thereof. Typically, reductant 22 is hydrocarbon reformate supplied from a source, not shown. When the valve core is rotated 90° in either direction, it will be seen that emissions 12 now flow to second trap 16b for NOx storage to yield cleaned exhaust 24, and reformate 22 flows to first trap 16a for regeneration thereof.

As noted above, a shortcoming of a prior art dual trap system such as system 10 is that each trap 16a, 16b is out of service for the entire time required to exhaust the opposite trap. In other words, the cycle time between trap alternations is governed by the time to exhaust rather than by the time to regenerate. For example, if the time to exhaust either trap is 30 seconds, and the time to regenerate either trap is 5 seconds, then one of the traps is ready for service but idle for 25 seconds out of 30, or 83% of the time. The either/or arrangement of prior art system 10 does not permit a scheme wherein the two traps may be employed simultaneously for combined NOx adsorption. This is wasteful of trap materials, which can be expensive, and of space in a vehicle, which can be at a premium. Also as noted above, the regenerated trap typically undergoes significant and undesirable cooling during its out-of-service time.

Figure 2:
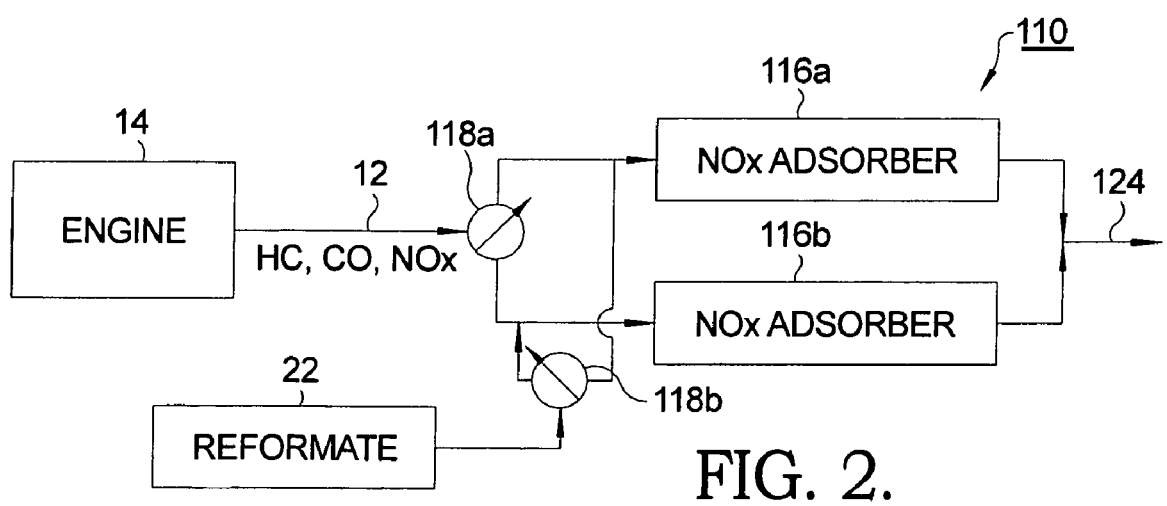
FIG. 2 is a schematic diagram of an improved dual NOx trap system in accordance with the invention.

Referring to FIG. 2, an improved dual trap system 110 in accordance with the invention comprises first and second NOx traps 116a, 116b, which may or may not be identical to prior art traps 16a, 16b. In a presently preferred embodiment, one or both of the traps is smaller and therefore less expensive than the corresponding prior art trap, which is a significant advantage of the invention. Prior art valve 18 is replaced by two three-way valves. A first valve 118a in exhaust stream 12 from engine 14 can deliver exhaust to either of traps 116a, 116b individually or to both traps simultaneously. A second valve 118b, shown as a three-way valve, can divert reformate 22 to either of traps 116a, 116b as desired (third position is an off position; no delivery to either trap. Second valve 118b may alternatively be a four-way valve whereby reformate may be diverted to another exhaust component or the engine intake (not shown). A control system (not shown) coordinates the actions of valves 118a, 118b.

It will be seen that as soon as regeneration of a trap is completed, the trap may be placed back into service by placing valve 118b in the off position and placing valve 118a in the dual delivery position.

One might question what is the cost in emissions quality of cleaned exhaust 124 during the period that system 110 is forced to operate on one trap alone, since in the preferred embodiment traps 116a, 116b are smaller than the corresponding prior art traps. The answer is two-fold. First, the length of time of single-trap operation is relatively short, as little as one-sixth or less of the operating time, as seen in the above example, and optimally the traps are cycled such that a trap is taken out of service for regeneration when the other trap is only partially exhausted; thus the impact of single trap operation is minimal. Second, the two traps operating together provide a much higher level of NOx reduction than does either of the prior art traps 16a, 16b operating independently, and significantly reduce the flow restriction of the exhaust system; thus the time-average of NOx emissions in cleaned exhaust 124 is substantially improved.

Referring to FIGS. 3 through 6, some performance comparisons between prior art system 10 and improved system 110 are shown.

Figure 3:
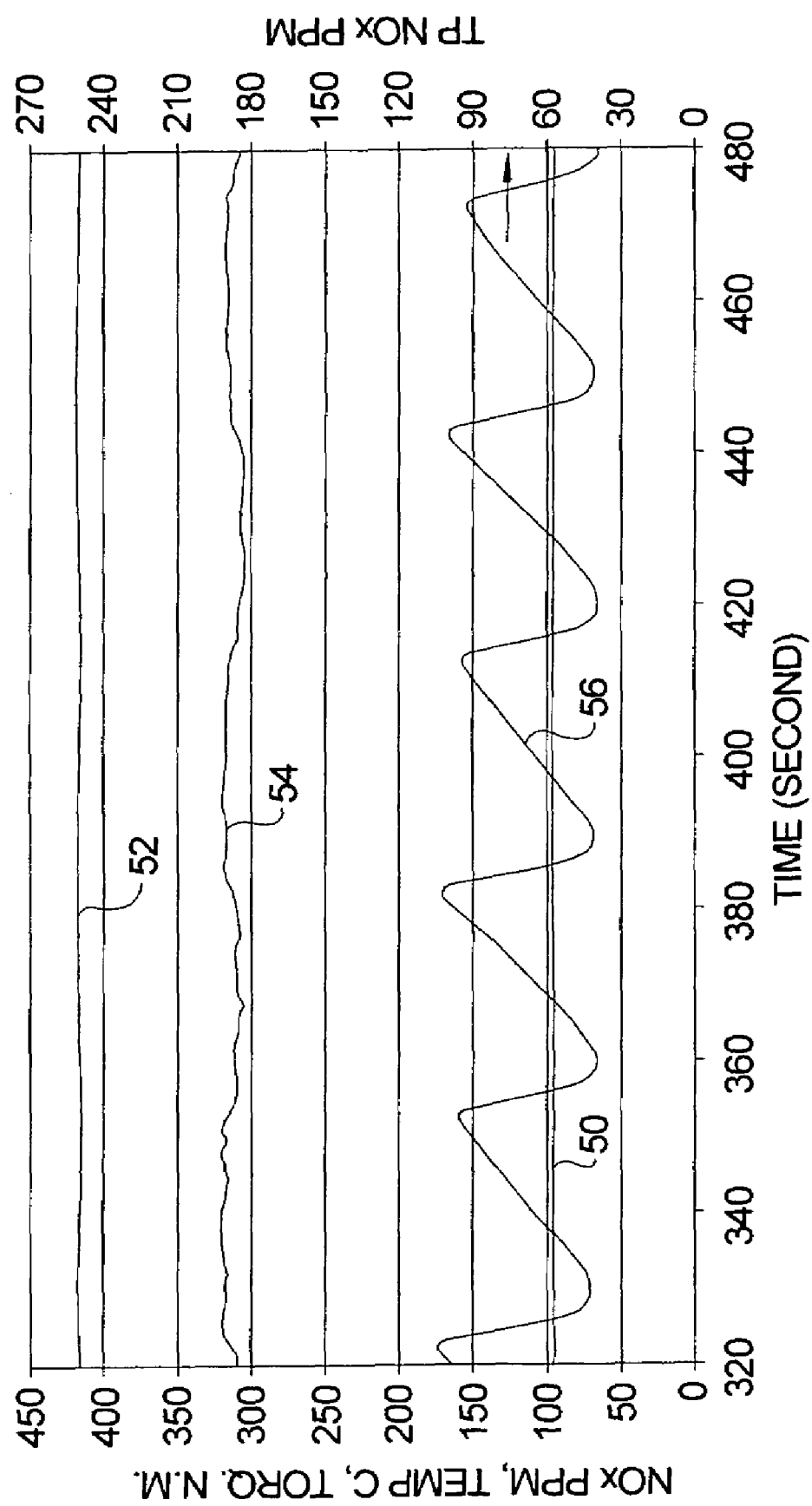
FIG. 3 is a graph showing performance curves for the prior art system shown in FIG. 1.
Figure 4:
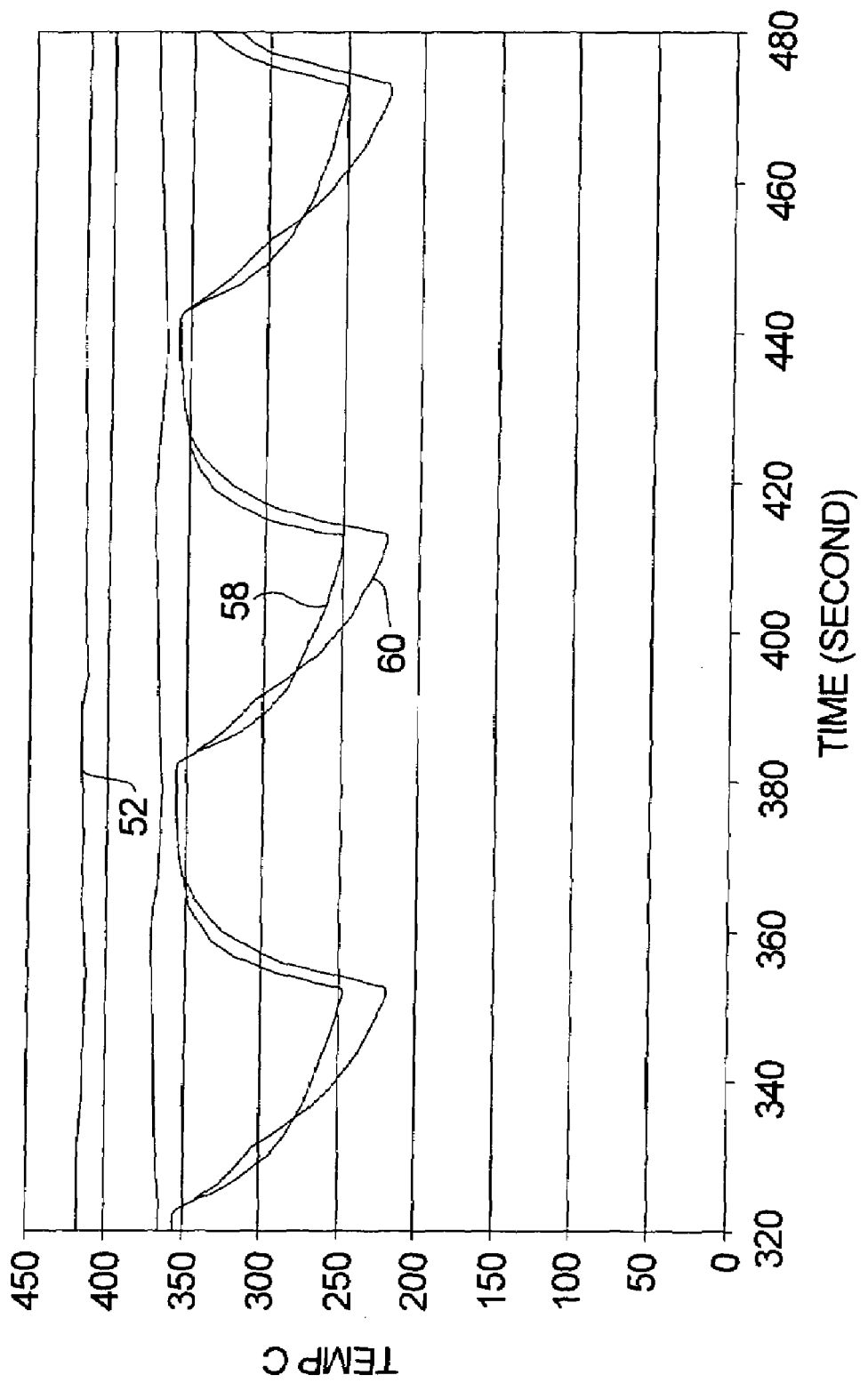
FIG. 4 is a graph showing additional performance curves for the prior art system shown in FIG. 1.

Referring to FIGS. 3 and 4, curves were generated by prior art system 10. Traps 16a,16b were alternated every 30 seconds. Engine 14 was operated at a constant torque of about 90 Nm (curve 50). Catalyst temperature in the traps during adsorption was maintained at 420° C. (curve 52). Regeneration was carried out for 9.01 seconds, using 4.25 L of reformate at 400° C. Entrance NOx level was substantially constant at about 310-320 ppm (curve 54). It is seen that the Tail Pipe (TP) NOx level in cleaned exhaust 24 varied systematically between about 40 ppm when a regenerated trap was placed into service and about 100 ppm when an exhausted trap was removed from service for regeneration (curve 56), for a time average NOx removal efficiency of about 78.1%. Further, temperature of the traps dropped by between 132° C. (curve 58) and 160° C. (curve 60) during trap regeneration, and the temperatures were relatively slow to recover.

Figure 5:
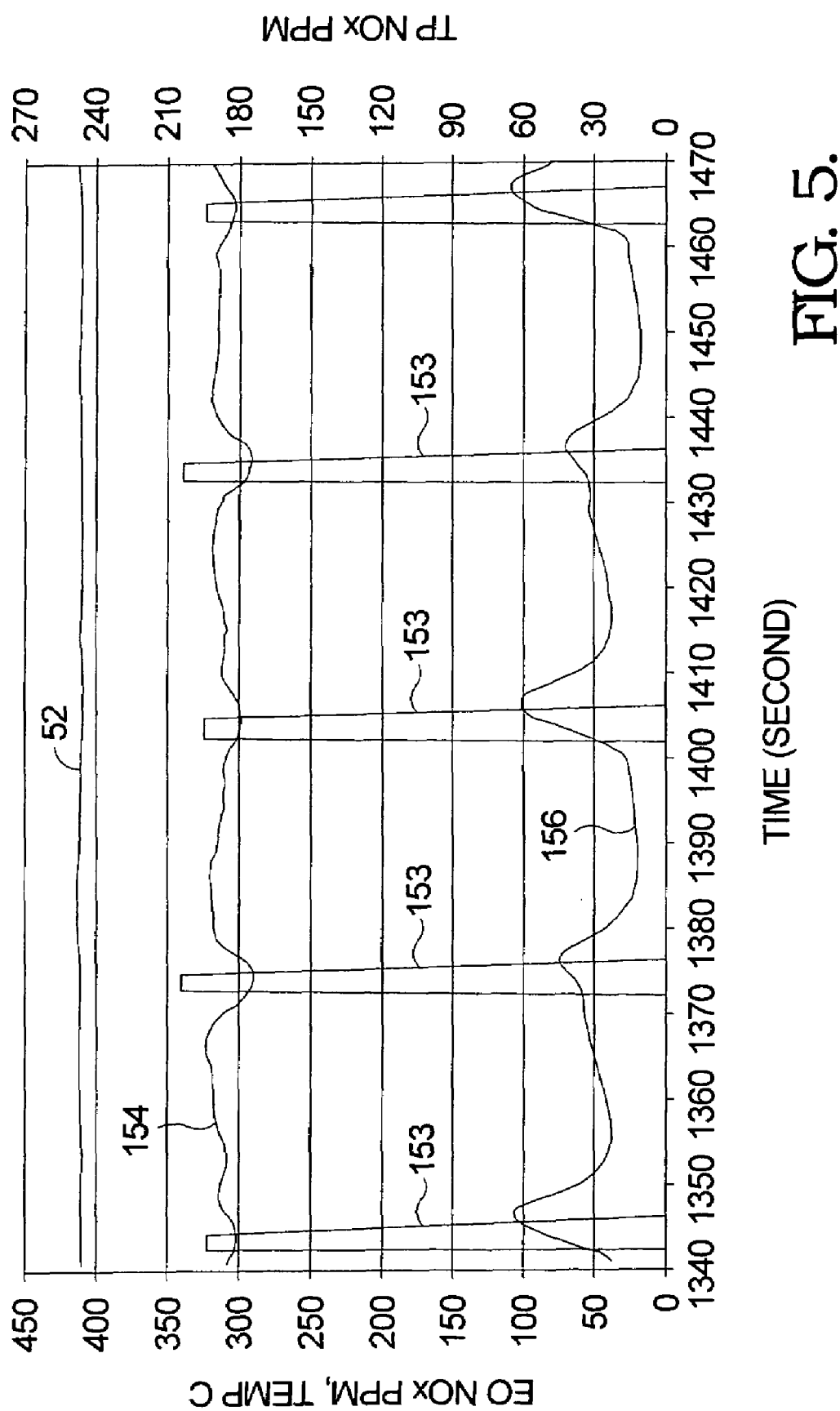
FIG. 5 is a graph showing performance curves for the improved system shown in FIG. 2, comparable to the prior art performance curves shown in FIG. 3.
Figure 6:
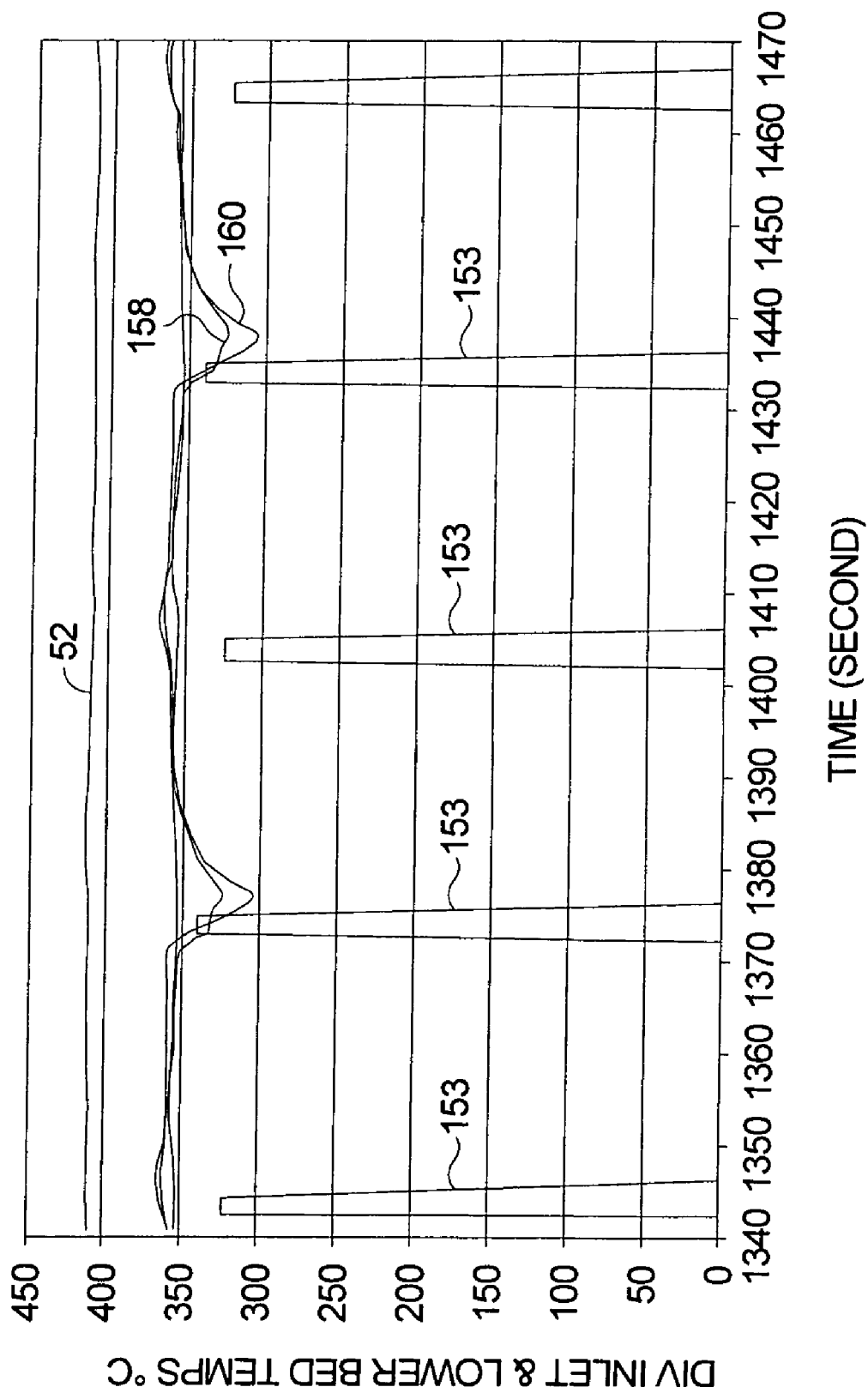
FIG. 6 is a graph showing additional performance curves for the improved system shown in FIG. 2, comparable to the prior art performance curves shown in FIG. 4.

Referring to FIGS. 5 and 6, curves were generated by improved system 110. Traps 116a, 116b were alternated every 30 seconds. Engine 14 was operated as in FIG. 3. Catalyst temperature in the traps during adsorption was maintained at 420° C. (curve 52). Regeneration was carried out for 3.0 seconds, using 3.0 L of reformate at 400° C. (curves 153). Entrance NOx level was substantially constant at about 310-320 ppm (curve 154). It is seen that the Tail Pipe (TP) NOx level in cleaned exhaust 124 varied systematically between about 15 ppm when a regenerated trap was placed into service and about 60 ppm when an exhausted trap was removed from service for regeneration (curve 156), for a time average NOx removal efficiency of about 91.4%, an overall improvement of about 17%. Further, temperature of the traps dropped by between only 25° C. (curve 158) and 50° C. (curve 160) during trap regeneration.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A dual trap emissions adsorber system for controlling nitrogen oxide emissions from an internal combustion engine exhaust stream, comprising:
   a) a first NOx trap;
   b) a second NOx trap arranged for parallel flow with said first NOx trap;
   c) a first valve disposed between entrances to said first and second NOx traps and in communication with said engine, said first valve being capable of diverting said engine exhaust stream through alternative flow paths consisting of said first NOx trap, said second NOx trap, and said first and second NOx traps simultaneously;
   d) a source of reductant for regeneration of said first and second NOx traps; and
   e) a second valve disposed between entrances to said first and second NOx traps and in communication with said source of reductant, said second valve being capable of diverting said reductant through alternative flow paths consisting of said first NOx trap and said second NOx trap to regenerate one of said first and second NOx traps, wherein said first valve discommunicates said engine exhaust stream from said NOx trap being regenerated.

2. A system in accordance with claim 1 further comprising controller for coordinating the actions of said first and second valve means.

3. A system in accordance with claim 1 wherein said first valve includes a three-way valve.

4. A system in accordance with claim 1 wherein said second valve includes a three-way valve.

5. A system in accordance with claim 1 wherein said second valve includes a four-way valve.

6. A system in accordance with claim 1 wherein each of said first and second NOx traps is characterized by a working adsorption time period and by a time period required for regeneration, and wherein said time period required for regeneration is shorter than said working adsorption time period.

7. A system in accordance with claim 6 wherein said working adsorption time period and said time period required for regeneration are such that said system may be operated in said alternative flow path consisting of said first and second NOx traps simultaneously during at least one half of the continuous time of operation of said system.

8. A system in accordance with claim 1 wherein said reductant includes hydrocarbon reformate.

9. A system in accordance with claim 1 wherein said internal combustion engine is a diesel engine.

10. In a dual trap emissions adsorber system for controlling nitrogen oxide emissions from an internal combustion engine exhaust stream, wherein said system includes a first NOx trap, a second NOx trap arranged for parallel flow with said first NOx trap, a first valve disposed between entrances to said first and second NOx traps and in communication with said engine, said first valve being capable of diverting said engine exhaust stream through alternative flow paths consisting of said first NOx trap, said second NOx trap, and said first and second NOx traps simultaneously, a source of reductant for regeneration of said first and second NOx traps, and a second valve disposed between entrances to said first and second NOx traps and in communication with said source of reductant, said second valve being capable of diverting said reductant through alternative flow paths consisting of said first NOx trap and said second NOx trap, a method of operating said system comprising the steps of:

a) passing said engine exhaust through said first and second NOx traps simultaneously;

b) actuating said first valve to cause said first NOx trap to become discommunicated from said engine exhaust stream;

c) actuating said second valve to cause said reductant from said reductant source to be diverted through said first NOx trap to cause regeneration of NOx- trapping elements therewithin;

d) further actuating said second valve to discommunicate said first NOx trap from said reductant source; and e) actuating said first valve to cause said first NOx trap to become recommunicated with said engine such that engine exhaust is again passing through said first and second NOx traps simultaneously.

11. A method in accordance with claim 10 comprising the further steps of:

f) actuating said first valve to cause said second NOx trap to become discommunicated from said engine exhaust stream;

g) actuating said second valve to cause said reductant from said reductant source to be diverted through said second NOx trap to cause regeneration of NOx-trapping elements therewithin;

h) further actuating said second valve to discommunicate said second NOx trap from said reductant source; and i) actuating said first valve to cause said second NOx trap to become recommunicated with said engine such that engine exhaust is again passing through said first and second NOx traps simultaneously.

12. An internal combustion engine comprising a dual trap emissions adsorber system for controlling nitrogen oxide emissions from an exhaust stream of said engine, wherein said system includes a first NOx trap, a second NOx trap arranged for parallel flow with said first NOx trap, a first valve disposed between entrances to said first and second NOx traps and in communication with said engine, said first valve being capable of diverting said engine exhaust stream through alternative flow paths consisting of said first NOx trap, said second NOx trap, and said first and second NOx traps simultaneously, a source of reductant for regeneration of said first and second NOx traps, and a second valve disposed between entrances to said first and second NOx traps and in communication with said source of reductant, said second valve being capable of diverting said reductant through alternative flow paths consisting of said first NOx trap and said second NOx trap to regenerate one of said first and second NOx traps, wherein said first valve discommunicates said engine exhaust stream from said NOx trap being regenerated.

13. An engine in accordance with claim 12 wherein said engine is a diesel engine.

* * * * *